United States Patent
Schultes et al.

(10) Patent No.: US 6,355,712 B1
(45) Date of Patent: Mar. 12, 2002

(54) POLYALKYL METHACRYLATE PLASTISOLS WITH IMPROVED FLOW PROPERTIES

(75) Inventors: Klaus Schultes, Wiesbaden; Guenther Schmitt, Darmstadt; Andreas Olschewski, Mainaschaff; Theodor Mager, Darmstadt, all of (DE)

(73) Assignee: Roehm GmbH & Co KG, Darmstadt (DE)

( * ) Notice: Subject to any disclaimer, the term of this patent is extended or adjusted under 35 U.S.C. 154(b) by 0 days.

(21) Appl. No.: 09/536,748

(22) Filed: Mar. 28, 2000

(30) Foreign Application Priority Data

Mar. 30, 1999 (DE) .......................................... 199 14 605

(51) Int. Cl.$^7$ ............................................... C08L 33/12
(52) U.S. Cl. ........................ 524/296; 524/297; 524/294; 524/315; 524/523; 525/309; 526/271; 526/259; 526/307.2; 526/307.3; 526/307.7; 526/319
(58) Field of Search ................................. 526/271, 259, 526/307.2, 307.3, 307.7, 319; 524/286, 89, 285, 296, 297, 523, 315, 294; 525/309

(56) References Cited

U.S. PATENT DOCUMENTS

| 3,361,696 A | | 1/1968 | Bolgiano et al. | |
|---|---|---|---|---|
| 4,210,567 A | * | 7/1980 | Kosters | 260/31.8 R |
| 4,345,006 A | * | 8/1982 | Loechel et al. | 428/473 |
| 4,558,084 A | * | 12/1985 | Quis et al. | 524/294 |
| 5,120,795 A | * | 6/1992 | Filgers et al. | 525/286 |
| 5,475,056 A | * | 12/1995 | Koesters et al. | 524/89 |

FOREIGN PATENT DOCUMENTS

| EP | 0 557 944 | 9/1993 |
|---|---|---|
| GB | 698193 | 10/1953 |

OTHER PUBLICATIONS

Textbook of Polymer Science, 3–d edition, Frec W. Billmeyer, JR. John Willey & Sons, 1987, pp. 389.*

Polymer Chemistry, second Edition, 1987, Raymoind Seymour et al Mercel Dekker, Inc., pp. 461, 533.*

* cited by examiner

Primary Examiner—David W. Wu
Assistant Examiner—Tanya Zalukaeva
(74) Attorney, Agent, or Firm—Oblon, Spivak, McClelland, Maier & Neustadt, P.C.

(57) ABSTRACT

The present invention is directed to a copolymer containing a hydrophilic copolymerizable monomer and a plastisol obtained by the use of the copolymer, which exhibits reduced viscosity and longer pot-life.

13 Claims, No Drawings

POLYALKYL METHACRYLATE PLASTISOLS WITH IMPROVED FLOW PROPERTIES

BACKGROUND OF THE INVENTION

1. Field of the Invention

The invention relates to (polyalkyl methacrylate) plastisols (PAMA plastisols) with improved flow properties achieved by the inclusion of hydrophilic monomers.

2. Discussion of the Related Art

Plastisols, i.e. two-phase systems comprised of plastic or synthetic resin particles and a suitable plasticizer or a suitable plasticizer mixture, can theoretically be produced from a variety of plastics, but until now, the applications with the greatest technical importance remained limited to a few polymer systems. Copolymerizates of poly(vinyl chloride) and other vinyl unsaturated monomers are known and are broadly used. A disadvantage here is their content of chlorine, which can have a corrosive effect under some conditions. These plastisols are also known as PVC plastics, plastisols, organosols, or plastigels (see also Ullmann's Encyclopedia of Industrial Chemistry, 5th edition, Vol. A21, pages 734–737, (1992); Becker-Braun, Kunststoff-Handbuch (Plastics Handbook), 2nd edition, Vol., 2/2, pages 1077–1090, C. Hanser (1986); H. F. Mark et al., ed., Encyclopedia of Polymer Science & Engineering, 2nd edition, supplemental volume, pages 568–643, Wiley-Interscience (1989); and Saechtling, Kunststoff Taschenbuch (Plastics Pocket Book), Carl Hanser Verlag, Munich, 26th edition (1995), pages 406 ff.).

Copolymerizates based on methyl methacrylate and butyl methacrylate, so-called PAMA plastisols, are used with great success for plastisols in the automotive sector. The plastisols are used as adhesive plastisols, sealant compounds, welding pastes, and underbody protection compounds, as well as floor coverings. But plastisols on an acrylate basis have also been available for practical use for quite some time (see DE 934 498; FR-A 2,291,248).

The latter named state of the art is based on the recognition that for the production of technically acceptable PAMA plastisols, coordination of the glass transition temperature, Tg, the particle size, and the composition of the polymer particles, on the one hand, and special plasticizers, on the other hand, are required.

U.S. Pat. No. 4,371,677 (Goodrich) describes a production process for a copolymerizate of PVC and acrylate, in which the acrylate is continuously added during polymerization. The viscosity of the plastisol paste which can be obtained from the PVC copolymerizate is reduced.

From the references JP 04059849, "Crosslinking via a chelate bond" by using an additional resin (JP 50105725: melamine resin; JP 63137832: functional PVC resin with low molecular weight), by using isocyanates (JP 07164576, JP 56016533, JP 50077471, JP 59033344) it is known to polymerize monomers containing hydroxyl groups with vinyl chloride. In this way, crosslinking of the plastisol is achieved. PVC-free plastisols with monomers containing hydroxyl groups are described in EP 557944, JP-OS 07/157622, GB 2278116, WO 9426813, EP 624606, DE 3900933 and JP 8182838.

The purpose of the inclusion of monomers containing hydroxyl groups is crosslinking of the cured plastisol by means of esterification, JP-OS 07/102147 describes the adjustment of a solubility parameter.

SUMMARY OF THE INVENTION

The present application is directed to developing a suitable copolymer powder for poly(alkyl methacrylate) (PAMA) plastisols that clearly reduces the viscosity of the PAMA plastisol, while improving also the shelf life of the pastes obtained.

DESCRIPTION OF THE PREFERRED EMBODIMENTS

Reducing the viscosity of a plastisol paste makes it possible to mix in more additives, such as pigments, fillers, and other processing aids, while maintaining a comparable polymer content of the plastisol paste, before the limit of processability of the finished plastisol is reached by the user.

The user is therefore enabled, by the composition according to the invention, to work with the plastisol paste more extensively and therefore longer than with a plastisol of the state of the art, before the increasing viscosity of the resulting finished plastisol mixture sets limits for the user in terms of application technology.

This behavior of the composition according to the invention is unexpected because the compounds containing hydroxyl groups that are state of the art act as crosslinking sites.

It was now found that the addition of hydrophilic compounds results in a surprising improvement of the paste rheology. A compound of general formula III is used as a hydrophilic compound:

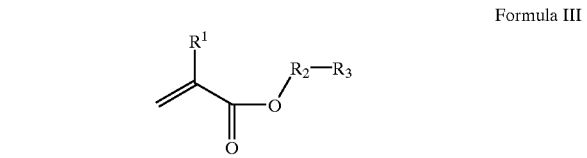

Formula III where:
$R_1 = $ —$CH_3$, H;
$R_2 = $ —$CH_2$—; —$(CH_2)_n$—
  $n = 2, 3$ or $4$,
  where the alkyl group can also be branched, such as isopropyl or isobutyl, for example:
$R_3 = $ —OH, —$NH_2$, —$N(R_4)_2$
$R_4 = $ —$CH_3$, —$CH_2$—$CH_3$ Applicants have accomplished the above task by using a copolymer with the following composition:

a) 0–90 wt.-% of an acrylic acid alkyl ester with at least 3 carbon atoms in the alkyl radical and/or a methacrylic acid alkyl ester with at least 2 carbon atoms in the alkyl radical and/or styrene, and 10–99 wt.-% methyl acrylate or methyl methacrylate or ethyl acrylate or ethyl methacrylate c) 1–20 wt.-% of a hydrophilic compound of formula III

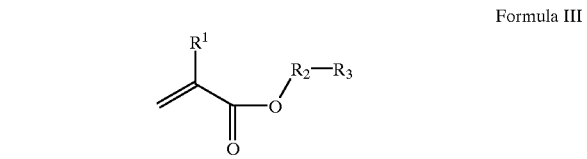

Formula III

-continued where:
$R_1 = $ —$CH_3$, H;
$R_2 = $ —$CH_2$—; —$(CH_2)_n$—
   n = 2, 3 or 4,
   where the alkyl group can also be branched, such as isopropyl or isobutyl;
$R_3 = $ —OH, —$NH_2$, —$N(R_4)_2$
$R_4 = $ —$CH_3$, —$CH_2$—$CH_3$ or 2-dimethylaminoethyl methacrylate,
d) 0.01–1 wt. % of a crosslinking agent or a mixture of crosslinking agents and
e) 0–20 wt.-% of other monomers that can be radically polymerized. For example, (meth)acrylic acid, N-vinyl imidazole, itaconic acid, maleic acid, fumaric acid, or α-methyl styrene can be used as component e).

The amounts of components a)–e) add up to 100 wt. %.

The copolymer powder obtained is processed to produce a plastisol, using known methods.

Such crosslinkable monomers according to component d) contain several units that can be radically polymerized, in the same molecule, for example such as a (meth)acrylic acid ester of multivalent alcohols. Examples that can be mentioned are trimethylol propane tri(meth)acrylate, 1,4-butane diol dimethacrylate, 1,3-butane diol dimethacrylate, 1,6-hexane diol dimethacrylate, and allyl methacrylate.

Production

The production of the polymers according to the invention takes place according to known methods, such as aqueous emulsion polymerization at a solid content of from 30 to 60 wt.%, preferable from 40 to 50 wt. % and more preferably about 50 wt. %, where the term about means plus or minus 5 wt. %. The copolymers according to the invention can be produced both as single-stage polymerizates and as multi-stage products.

Multi-stage polymerization processes yield a core-shell structure of the resulting particles, where the shells can also occur in multiple form, so that the core can be surrounded by several shells, each with a different composition.

Having generally described this invention, a further understanding can be obtained by reference to certain specific examples which are provided herein for purposes of illustration only and are not intended to be limiting unless otherwise specified.

The following Examples are also recited in the priority document, German patent application 199 14 605.5, filed Mar. 30, 1999, which is incorporated herein by reference in its entirety.

EXAMPLES

Implementation of Emulsion Polymerization Using the Single-Stage Process

Single-stage system:

The appropriate material as shown in Table 1a was heated to 80° C. Subsequently, the initiator was added. After a pause of 5 minutes, the added material 1 was metered in, substantially uniformly, over a period of 240 minutes. After the end of addition, the dispersion was heated at 80° C. for 2 hours, and mixed with initiator, if applicable (see packing and end polymerization). After cooling to room temperature, the dispersion was packed. Examples 1 and 2 were produced using the single-stage polymerization process.

Implementation of Emulsion Polymerization Using the Two-Stage Process

Two-stage system:

The appropriate material, as shown in Table 1a, was heated to 80° C. Subsequently, the initiator was added. After a pause of 5 minutes, the added material 1 was metered in, substantially uniformly, over a period of 90 minutes and subsequently, the added material 2 was metered in within a period of 90 minutes. After the end of addition, the mixture was heated at 80° C. for 1 hour, then cooled to 60° C., and INTEROX TBHP80, $FeSO_4$ 7 $H_2O$, dissolved in water with ammonia, was added. Subsequently, BRÜGGOLIT C, dissolved in water, was metered in within a period of 30 minutes, and subsequently, stirring was continued for another 30 minutes. After cooling to room temperature, the dispersion was packed.

TABLE 1a

Materials used in the various examples

| Example Unit | Comparative Example 1 kg | Comparative Example 2 kg | Comparative Example 3 kg | Example 1 g | Example 2 kg | Example 3 kg |
|---|---|---|---|---|---|---|
| Material | | | | | | |
| Water | 16 | 19 | 16 | 1,185.5 | 16 | 16 |
| SERMUL EA 205 | 0.0014 | | | 1.05 | | |
| Emulsifier K30 | | 0.0037 | 0.012 | | 0.00312 | 0.012 |
| 4-azobis-(4-cyanovalerianic acid)-Na-salt | 0.02 | | | 15 | | |
| APS | | 0.0059 | 0.08 | | 0.005 | 0.08 |
| Added Material 1 | | | | | | |
| Water | 24.3094 | 29.72 | 11.58 | 1638.3 | 24.23 | 11.58 |
| Sermul EA 205 | 0.22 | | | 165 | | |
| Emulsifier K30 | | 0.2328 | 0.094 | | 0.196 | 0.094 |
| 4-azobis-(4-cyanovlaerianic acid)-Na-salt | 0.04 | | | 30 | | |
| APS | | | 0.004 | | | 0.004 |
| MMA | 40 | 46.55 | 9.6 | 2847 | 37.16 | 9.6 |
| BMA | | | 10 | | | 9.98 |
| REMA | — | — | — | 150 | 2 | |
| Allyl methacrylate | | | | 3 | 0.04 | 0.02 |

TABLE 1a-continued

Materials used in the various examples

| Example | Unit | Comparative Example 1 kg | Comparative Example 2 kg | Comparative Example 3 kg | Example 1 g | Example 2 kg | Example 3 kg |
|---|---|---|---|---|---|---|---|
| Itaconic acid | | | 0.95 | | | 0.8 | |
| N-vinyl imidazole | | | | 0.4 | | | 0.404 |
| Ethylhexyl thioglycolate | | 0.028 | | | 2.1 | | |
| PALATINOL N | | | 0.95 | | | 0.8 | |
| Added Material 2 | | | | | | | |
| Water | | | | 11.58 | | | 11.58 |
| Emulsifier K30 | | | | 0.094 | | | 0.094 |
| APS | | | | 0.004 | | | 0.004 |
| MMA | | | | 20 | | | 19 |
| HEMA | | | | | | | 1 |

Explanations:
- MMA: methyl methacrylate,
- HEMA: hydroethyl methacrylate
- BMA: n-butyl methacrylate
- APS: ammonium persulfate Sermul EA 205: emulsifier containing phosphorus, manufactured by Servo
- Emulsifier K30, manufactured by BAYER AG, Leverkusen, Germany
- PALATINOL N: plasticizer available from BASF.
- NOPCO NXZ, deforming agent, manufactured by Henkel KgaA, Düsseldorf, Germany Example 3 was produced according to the two-stage polymerization process, comparative examples 1 and 2 were produced according to the single-stage conditions, comparative example 3 according to the two-stage conditions.

The dispersions obtained according to the regulations of all the examples were subsequently spray-dried, as described in EP 477 708 and EP 154 189.

TABLE 1b

Materials used in the various examples

| Example | Unit | Comparative Example V1 1 kg | Comparative Example V2 2 kg | Comparative Example 3 3 kg | Example 1 1 g | Example 2 2 kg | Example 3 3 kg |
|---|---|---|---|---|---|---|---|
| Packing and post-polymerization | | | | | | | |
| AGITAN 218 | | 0.01 | 0.019 | | 0.75 | 0.016 | |
| APS | | | 0.0095 | | | 0.008 | |
| Formalin solution, 35% | | | | 0.01 | 0.75 | | 0.01 |
| Water | | | 0.5 | 1.1 | 10 | 0.8 | 1.1 |
| INTEROX TBHP80 | | | | 0.02 | | | 0.02 |
| FeSO$_4$7.H$_2$O | | | | 0.0004 | | | 0.0004 |
| Nitrilotriacetic acid | | | | 0.0004 | | | 0.0004 |
| Ammonia, 25% | | | | 0.002 | | | 0.002 |
| BRÜGGOLIT C | | | | 0.02 | | | 0.02 |
| NOPCO NXZ | | | | 0.16 | | | 0.16 |

Abbreviations:
- MMA: methyl methacrylate
- HEMA: hydroethyl methacrylate
- BMA: n-butyl methacrylate
- APS: ammonium persulfate
- AGITAN 218: anti-foaming agent manufactured by Münzing Chemie GmbH
- BRÜGGOLIT C: sodium formaldehyde sulfoxylate manufactured by BRÜGGEMANN KG
- INTEROX TBNP80, initiator, manufactured by Peroxide-Chemie GmBH, Pullach, Germany Method for Production of a Plastisol Paste from the Polymer Powder ISO 11458 was used as the basis for the production of plastisols.

The plasticizer was presented in a metal can and the polymer to be tested was weighed in. This sample was placed under a dissolver. The plastisol was stirred at 2000 rpm for 150 sec. Then a pause was made, and material that had not yet been completely stirred in, and was still located on the spindle and the inside wall and bottom of the beaker was mixed into this mass using a spatula. Stirring then continues at 2000 rpm for another 150 sec. If necessary, the temperature after stirring was recorded. If it was too high, changes had to be made in the formulation. To determine the viscosity of the plastisol, evaluation of the mass was recommended.

The plastisol pastes that were produced are listed in Table 2

TABLE 2

Formulations of the individual plastisol pastes.
The numbers listed relate to the weight in grams.

| Paste | A | B | C | D | E | F |
|---|---|---|---|---|---|---|
| Polymer | | | | | | |
| Comparative Example V1 | 160 | | | | | |
| Comparative Example V2 | | 160 | | | | |
| Comparative Example V3 | | | 200 | | | |
| Example 1 | | | | 160 | | |
| Example 2 | | | | | 160 | |
| Example 3 | | | | | | 200 |
| Plasticizer | | | | | | |
| SANTICIZER 261 | 240 | 240 | | 240 | 240 | |
| PALATINOL AH | | | 200 | | | 200 |

SANTICIZER 261 is a plasticizer based on benzyloctyl phthalate, manufactured by Solutia/B.
PALATINOL AH is a plasticizer based on di-2-ethylhexyl phthalate, manufactured by BASF.

Testing of the Plastisol Pastes

The plastisol pastes were stored at 30° C. and tested with regard to their viscosity after specific intervals (Haake rotation viscosimeter RVZ/measurement cell SV2, shear gradient: 57$^{-1}$). As is clearly evident in Table 3 (compare paste A with D, B with E, and C with F), the plastisol pastes with the modified PAMA polymers (pastes D, E, and F) clearly show lower viscosity and better storage stability.

TABLE 3

Viscosity of different plastisol pastes after specific intervals. All of the numbers possess the unit mPa · s; the abbreviation "n.m." means "not measurable" (due to overly high viscosity)

| Time | A | B | C | D | E | F |
|---|---|---|---|---|---|---|
| initial value/immediately | 1566 | 2204 | 17400 | 1218 | 2088 | 8700 |
| 1 d | 3480 | 2494 | 12760 | 1392 | 2088 | 8120 |
| 7 d | n.m. | 3016 | 15080 | | 2378 | 8120 |
| 14 d | n.m. | 3364 | | | 2088 | 3016 |
| 21 d | n.m. | 4640 | | 3654 | | |
| 28 d | n.m. | 4524 | 37700 | n.m. | 3464 | 9280 |
| 35 d | n.m. | 4872 | | n.m. | 3306 | |
| 49 d | n.m. | 6960 | | n.m. | 3712 | |
| 56 d | | | n.m. | | | 59520 |

From the values in Table 3, it is evident that a plastisol with the composition according to the invention (pastes D, E, and F) clearly show better viscosity values than a plastisol with a composition according to the state of the art. If pastes demonstrate viscosities of more than 5000 mP·s, they are no longer usable in practical terms, for reasons of processing technology.

Production of the Plastisol Films

The plastisol pastes were drawn onto a sheet of steel, using a film-drawing frame (gap height 500 μm). To gel the films (within no more than 30 min after application), all of the coated steel sheets were gelled in an oven for 10 min, at 180° C.

Testing of the Plastisol Films
The films were assessed optically (see Table 4):

TABLE 4

Optical assessment of the films made from various plastisol pastes.
(Abbreviation k.A. = plasticizer does not float out)

| Paste | A | B | C | D | E | F |
|---|---|---|---|---|---|---|
| Appearance of the film | clear, k.A. | clear, k.A. | slightly cloudy, k.A. | clear, k.A. | clear, k.A. | slightly cloudy, k.A. |

Obviously, numerous modifications and variations of the present invention are possible in light of the above teachings. It is therefore to be understood that within the scope of the appended claims, the invention may be practiced otherwise than as specifically described herein.

What is claimed is:

1. A plastisol composition, comprising:
   1) a copolymer composed of monomer components comprising:
      a) 0–90 wt.-% of a monomer selected from the group consisting of an acrylic acid alkyl ester with at least 3 carbon atoms in the alkyl radical, a methacrylic acid allyl ester with at least 2 carbon atoms in the alkyl radical, styrene and mixtures thereof;
      b) 10–99 wt.-% of monomer selected from the group consisting of methyl methylacrylate and ethyl acrylate;
      c) 1–20 wt. % of a hydrophilic compound of the formula (III):

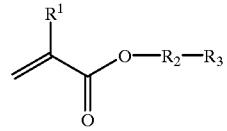

(III)

wherein:
R$^1$ is —CH$_3$, —H;
R$^2$ is —CH$_2$—; —(CH$_2$)$_n$—, wherein n is 2, 3, or 4; and wherein the —(CH$_2$)$_n$—group is branched or unbranched;
R$^3$ is —OH, —NH$_2$, —N(R$_4$)$_2$; wherein R$^4$ is —CH$_3$, or —CH$_2$—CH$_3$;
      d) 0.01–1 wt. % of a crosslinking agent or a mixture of crosslinking agents; and
      e) 0–20 wt. % of other monomers that are radically polymerizable; wherein the relative amounts of components (a)–(e) add up to 100 wt. % of the monomer components; and
   2) a plasticizer.

2. The plastisol composition of claim 1, wherein said copolymer is obtained by a single-stage polymerization process of components (a)–(e).

3. The plastisol composition of claim 1, wherein said copolymer is obtained by a multi-stage polymerization process of components (a)–(e).

4. The plastisol composition of claim 1 wherein said component (e) is a monomer selected from the group consisting of (meth)acrylic acid, N-vinyl imidazole, itaconic acid, maleic acid, fumaric acid, α-methyl styrene and mixtures thereof.

5. The copolymer of claim 1, wherein said component (d) is a monomer selected from the group consisting of trimethylol propane tri(meth)acrylate, 1,4-butane diol dimethacrylate, 1,3-butane diol dimethacrylate, 1,6-hexane diol dimethacrylate, allyl methacrylate and mixtures thereof.

6. The plastisol composition of claim 1, wherein said hydrophilic compound c) is hydroxyethyl methacrylate.

7. The plastisol composition of claim 4, wherein said component e) is N-vinylimidazole.

8. The plastisol composition of claim 5, wherein said component d) is allyl methacrylate.

9. The plastisol composition of claim 1, wherein said plasticizer is a phthalate-based plasticizer.

10. The plastisol composition of claim 9, wherein said plasticizer comprises benzyloctyl phthalate.

11. The plastisol composition of claim 9, wherein said plasticizer comprises 2-ethylhexyl phthalate.

12. The plastisol composition of claim 1, wherein for said component c) of said copolymer $R^3$ is —OH.

13. A method for reducing the melt viscosity of a polymer comprising mixing said polymer with plastisol composition, obtained in accordance with claims 1.

* * * * *

UNITED STATES PATENT AND TRADEMARK OFFICE
CERTIFICATE OF CORRECTION

PATENT NO.   : 6,355,712 B1
DATED        : March 12, 2002
INVENTOR(S)  : Klaus Schultes et al.

It is certified that error appears in the above-identified patent and that said Letters Patent is hereby corrected as shown below:

<u>Columns 4-5,</u>
Table 1a delete in its entirety and insert therefore

TABLE 1a
Materials used in the various examples

| Example | V1 | V2 | V3 | 1 | 2 | 3 |
|---|---|---|---|---|---|---|
| Units | kg | kg | kg | g | kg | kg |
| Amount presented | | | | | | |
| Water | 16 | 19 | 16 | 1185.5 | 16 | 16 |
| Sermul EA 205 | 0.0014 | | | 1.05 | | |
| Emulsifier K30 | | 0.0037 | 0.012 | | 0.00312 | 0.012 |
| 4-azo-bis-(4-cyanovalerianic acid)-Na salt | 0.02 | | | 15 | | |
| APS | | 0.0059 | 0.08 | | 0.005 | 0.08 |
| Amount run in 1 | | | | | | |
| Water | 24.3094 | 29.72 | 11.58 | 1638.3 | 24.23 | 11.58 |
| Sermul EA 205 | 0.22 | | | 165 | | |
| Emulsifier K30 | | 0.2328 | 0.094 | | 0.196 | 0.094 |
| 4-azo-bis-(4-cyanovalerianic acid)-Na salt | 0.04 | | | 30 | | |
| APS | | | 0.004 | | | 0.004 |
| MMA | 40 | 46.55 | 9.6 | 2847 | 37.16 | 9.6 |
| BMA | | | 10 | | | 9.98 |
| HEMA | | | | 150 | 2 | |
| Allylmethacrylate | | | | 3 | 0.04 | 0.02 |
| Itaconic acid | | 0.95 | | | 0.8 | |
| N-vinylimidazole | | | 0.4 | | | 0.4 |
| Ethylhexylthioglycolate | 0.028 | | | 2.1 | | |
| PLATINOL N | | 0.95 | | | 0.8 | |
| Amount run in 2 | | | | | | |
| Water | | | 11.58 | | | 11.58 |
| Emulsifier K30 | | | 0.094 | | | 0.094 |
| APS | | | 0.004 | | | 0.004 |
| MMA | | | 20 | | | 19 |
| HEMA | | | | | | 1 |

UNITED STATES PATENT AND TRADEMARK OFFICE
CERTIFICATE OF CORRECTION

PATENT NO. : 6,355,712 B1
DATED : March 12, 2002
INVENTOR(S) : Klaus Schultes et al.

It is certified that error appears in the above-identified patent and that said Letters Patent is hereby corrected as shown below:

Column 5,
Lines 20-25, delete
"Explanations:
MMA: methyl methacrylate,
HEMA: hydroethyl methacrylate
BMA: n-butyl methacrylate
APS: ammonium persulfate Sermul EA 205:
emulsifier containing phosphorus, manufactured by Servo"
And insert therefore
-- Abbreviations:
MMA: methylmethacrylate
HEMA: hydroxyethylmethacrylate
BMA: n-butylmethacrylate
APS: ammonium persulfate Sermul EA 205:
emulsifier containing phosphorus, manufactured by: Servo --
Lines 53-55, delete
"MMA: methyl methacrylate
 HEMA: hydroethyl methacrylate
 BMA: n-butyl methacrylate"
And insert therefore
-- MMA: methylmethacrylate
   HEMA: hydroxyethylmethacrylate
   BMA: n-butylmethacrylate --

Signed and Sealed this

Twelfth Day of November, 2002

Attest:

Attesting Officer

JAMES E. ROGAN
Director of the United States Patent and Trademark Office